US012754993B2

(12) United States Patent
Kobayashi et al.

(10) Patent No.: US 12,754,993 B2
(45) Date of Patent: Oct. 6, 2026

(54) AUTHENTICATION DEVICE, AUTHENTICATION SYSTEM, AND AUTHENTICATION METHOD

(71) Applicant: Mitsubishi Electric Corporation, Tokyo (JP)

(72) Inventors: Tsuyoshi Kobayashi, Tokyo (JP); Koichi Furuya, Tokyo (JP); Noriyuki Fukui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 31 days.

(21) Appl. No.: 19/096,336

(22) Filed: Mar. 31, 2025

(65) Prior Publication Data

US 2025/0232023 A1 Jul. 17, 2025

Related U.S. Application Data

(63) Continuation of application No. PCT/JP2022/043652, filed on Nov. 28, 2022.

(51) Int. Cl.
*G06F 21/44* (2013.01)

(52) U.S. Cl.
CPC ...... *G06F 21/44* (2013.01); *G06F 2221/2103* (2013.01)

(58) Field of Classification Search
CPC ...................................................... G06F 21/44
See application file for complete search history.

(56) References Cited

U.S. PATENT DOCUMENTS 8,203,347 B2 * 6/2012 Nakayama ............. G01R 27/28
324/650
9,476,932 B2 * 10/2016 Furse ................. G01R 31/2841
(Continued)

FOREIGN PATENT DOCUMENTS

JP 2016-192840 A 11/2016
JP 2020-145533 A 9/2020
JP 7154444 B1 10/2022

OTHER PUBLICATIONS

Japanese Office Action for Japanese Application No. 2024-220441, dated Oct. 23, 2025, with English translation.
(Continued)

*Primary Examiner* — Simon P Kanaan
(74) *Attorney, Agent, or Firm* — Birch, Stewart, Kolasch & Birch, LLP

(57) ABSTRACT

An authentication device includes: a challenge data generation unit to generate challenge data from a registered electromagnetic characteristic; an expected value generation unit to perform a comparison between the registered electromagnetic characteristic and the generated challenge data, and generate a response data expected value representing a result of the comparison; a challenge data transmission unit to transmit the generated challenge data to a response device; a response data reception unit to receive response data related to a second authentication target device from the response device; and a response data determination unit to perform a comparison between the generated response data expected value and the received response data, and determine authenticity of the second authentication target device, and the response device performs a comparison between an electromagnetic characteristic acquired from the second
(Continued)

authentication target device and the transmitted challenge data, and generates a result of the comparison as the response data.

18 Claims, 4 Drawing Sheets

(56) References Cited

U.S. PATENT DOCUMENTS

| | | | | |
|---|---|---|---|---|
| 2003/0083831 | A1* | 5/2003 | Agrawal | G06F 21/556 702/65 |
| 2010/0230597 | A1* | 9/2010 | Kumhyr | G01J 5/02 374/E13.001 |
| 2016/0294206 | A1 | 10/2016 | Okawa et al. | |
| 2020/0288078 | A1 | 9/2020 | Okura et al. | |
| 2024/0119135 | A1 | 4/2024 | Kobayashi et al. | |

OTHER PUBLICATIONS

International Search Report issued in PCT/JP2022/043652 (PCT/ISA/210), dated Feb. 14, 2023.

Kaji et al., "Fundamental Study on Individual Identification Method of Electronic Device Using Difference of Radiation Spectrum Caused by Manufacturing/Mounting Variations", The Institute of Electronics, Information and Communication Engineers, IEICE Technical Report, Feb. 20, 2019, vol. 118, No. 457, pp. 163-167.

* cited by examiner

AUTHENTICATION DEVICE, AUTHENTICATION SYSTEM, AND AUTHENTICATION METHOD

CROSS REFERENCE TO RELATED APPLICATION

This application is a Continuation of PCT International Application No. PCT/JP2022/043652 filed on Nov. 28, 2022, all of which is hereby expressly incorporated by reference into the present application.

TECHNICAL FIELD

The present disclosure relates to authentication technology of an electronic device.

BACKGROUND ART

In conventional authentication of an electronic device, electromagnetic characteristics of the electronic device are measured, and the measured electromagnetic characteristics are pre-stored. Later on, an electromagnetic characteristic of an authenticity-check target device is measured, and the measured electromagnetic characteristic of the authenticity-check target device and the pre-stored electromagnetic characteristics of the electronic device are collated with each other, thereby determining authenticity of the authenticity-check target device (e.g. Patent Literature 1). In addition, there is also a method that has been proposed in which authentication is performed by focusing on the spectrum of electromagnetic waves radiated from an electronic device as the electromagnetic characteristics of the electronic device (e.g. Non-Patent Literature 1).

CITATION LIST

Patent Literature

Patent Literature 1: U.S. Patent Application Publication No. 2010/0230597

Non-Patent Literature

Non-Patent Literature 1: Shugo Kaji, et. al., Fundamental Study on Individual Identification Method of Electronic Device Using Difference of Radiation Spectrum Caused by Manufacturing/Mounting Variations, IEICE Tech. Rep., Japan, IEICE, 2019.02.20, Vol. 118, No. 457, pp. 163-167.

SUMMARY OF INVENTION

Technical Problem

In conventional technologies, it is necessary to dispose a device that performs authentication (authentication device) near an authenticity-check target device (authentication target device), and to collate an electromagnetic characteristic of the authentication target device measured at the site with the electromagnetic characteristics pre-stored in the authentication device. In addition, if an authentication device and an authentication target device are at different locations, and it is attempted to perform authentication via a communication network, it is necessary to send electromagnetic characteristics data of the authentication target device to the authentication device over the communication network. There is a problem that, in a case where communication is performed via a communication network, if communication data on the communication network is intercepted, and the electromagnetic characteristics data of the authentication target device is leaked undesirably, a spoofing device is authenticated as the authentic authentication target device.

The present disclosure has been made to solve such a problem, and an object thereof is to provide authentication technology that can prevent leakage of electromagnetic characteristics of an authentication target device in a case where authentication of the authentication target device is performed via a communication network.

Solution to Problem

An aspect of an authentication device according to an embodiment of the present disclosure includes: processing circuitry to generate challenge data which is a dataset based on at least one electromagnetic characteristic of a first authentication target device, acquired from the first authentication target device; to perform a comparison between the electromagnetic characteristic of the first authentication target device and the generated challenge data, and to generate a response data expected value representing a result of the comparison; and to perform a comparison between the generated response data expected value and response data related to a second authentication target device transmitted from a response device, and to determine authenticity of the second authentication target device, and the generated challenge data is transmitted to the response device, a result of a comparison between an electromagnetic characteristic of the second authentication target device, acquired from the second authentication target device, and the transmitted challenge data is received as the response data from the response device, the electromagnetic characteristic of the first authentication target device and the electromagnetic characteristic of the second authentication target device are characteristics expressed as a two-dimensional graph including an X axis and a Y axis, and the challenge data is generated as a set [Xn, Yn] (n is an integer) of a plurality of X-axis values Xn and Y-axis threshold values Yn corresponding to the respective X-axis values.

Advantageous Effects of Invention

The authentication device according to embodiments of the present disclosure can prevent leakage of electromagnetic characteristics of an authentication target device since the electromagnetic characteristics of the authentication target device are not transmitted and received.

DESCRIPTION OF EMBODIMENTS

Figure 1:
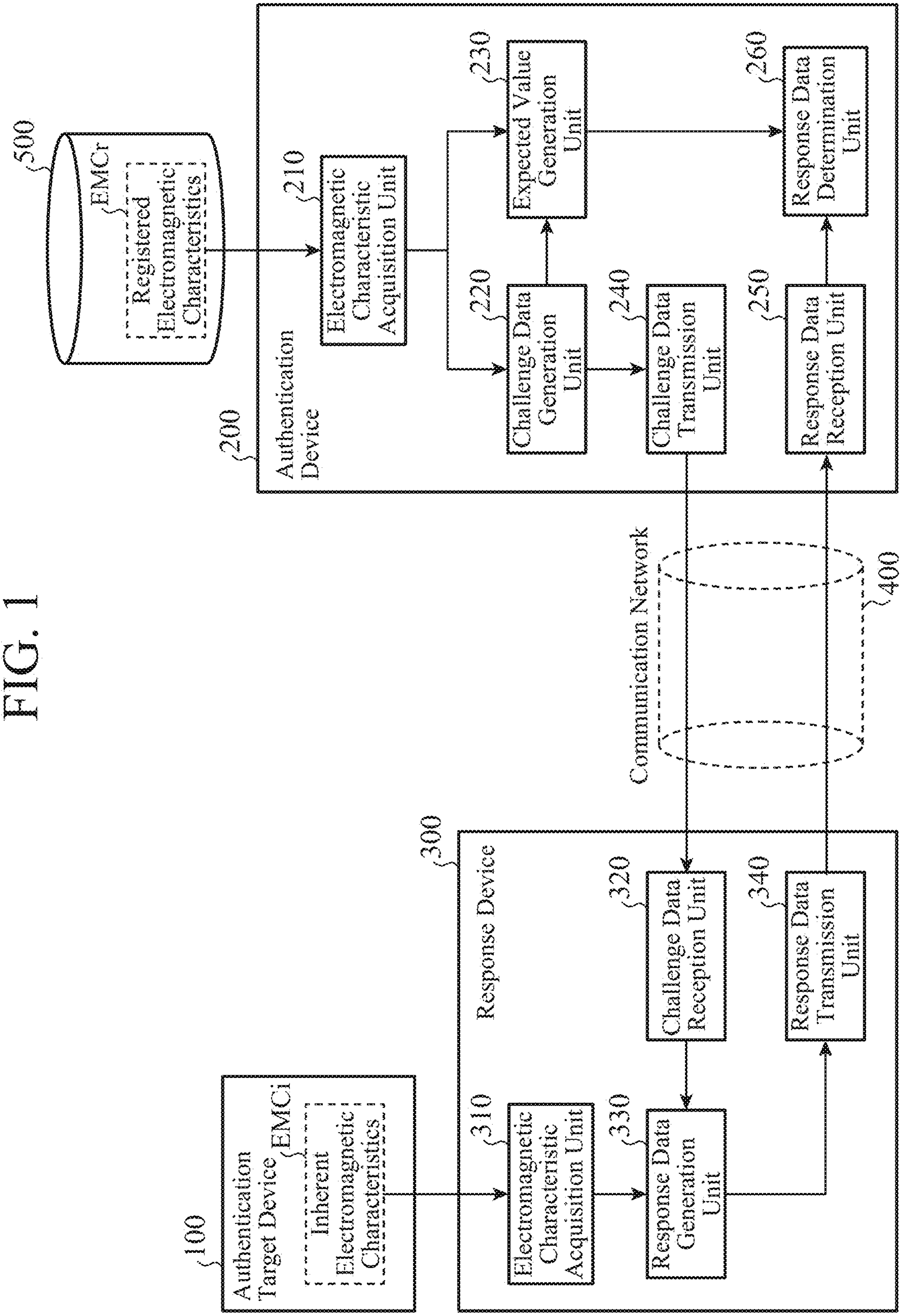
FIG. 1 is a diagram illustrating a configuration example of an authentication system including an authentication device and a response device.

Hereinafter, various embodiments according to the present disclosure are explained in detail with reference to the attached drawings. Note that constituent elements that are given identical or similar reference signs in the drawings have identical or similar configurations or functions, and overlapping explanation about such constituent elements is omitted.

First Embodiment

<Configuration>

(Authentication System)

The configuration of an authentication system including an authentication device and a response device according to a first embodiment of the present disclosure is explained with reference to FIGS. 1 and 2. The authentication system according to the present disclosure is a system that performs authentication of an authentication target device (second authentication target device) 100. That is, the authentication target device 100 is a device that requests to authenticate itself. The authentication target device 100 has inherent electromagnetic characteristics (electromagnetic characteristics: EMC). Hereinafter, the inherent electromagnetic characteristics EMC are written as electromagnetic characteristics EMCi using the initial letter of inherent meaning "inherent."

The authentication target device 100 has electromagnetic characteristics EMCi different from those of other unillustrated authentication target devices depending on its own constituent components, manufacturing errors of its printed circuit board, its assembling errors, and the like, even if the authentication target device 100 is manufactured according to the same design as the other unillustrated authentication target devices. For example, examples of such electromagnetic characteristics EMCi include radioactive electromagnetic noise radiated into space due to operation performed by the authentication target device 100, and conductive electromagnetic noise conveyed through a cable at the time of operation of the authentication target device 100. In addition, other examples of the electromagnetic characteristics EMCi include: reflectance characteristics (the $S_{11}$ characteristics in S parameters) observed from a particular external I/F such as a power supply connector or a signal connector of the authentication target device 100 independently of operation by the authentication target device 100 (On/Off of the power supply); characteristics of passage among a plurality of external I/Fs (the $S_{nm}$ characteristics in S parameters; n and m are numbers allocated to the plurality of external I/Fs); F parameters, Z parameters, and Y parameters obtained by conversion from S parameters; and the like. Although these are characteristics typically represented along a frequency axis, the electromagnetic characteristics EMCi of the authentication target device 100 may be characteristics represented along a time axis such as a reflection waveform or a passage waveform at another external I/F that is observed when a step wave or an impulse wave is applied to a particular external I/F of the authentication target device 100. In addition, a combination of a plurality of electromagnetic characteristics may be used as the electromagnetic characteristics EMCi. For example, examples of the authentication target device 100 include an electrical device and an electronic device, and an electrical component and an electronic component, but are not limited to these examples as long as electromagnetic characteristics can be acquired from the authentication target device 100. For example, the authentication target device 100 may be a mechanical component not including an electrical circuit.

In order to perform authentication of the authentication target device 100, as illustrated in FIG. 1, the authentication system according to the present disclosure includes an authentication device 200, a storage device 500, and a response device 300. Communication between the authentication device 200 and the response device 300 is performed via a wired or wireless communication network 400. The storage device 500 is a device in which electromagnetic characteristics EMCi of one authentication target device or two or more authentication target devices are pre-registered. Hereinafter, electromagnetic characteristics EMCi of an authentication target device (first authentication target device) registered in the storage device 500 are written as electromagnetic characteristics EMCr using the initial letter of registered meaning "registered."

(Authentication Device)

The authentication device 200 is a device to perform authentication of the authentication target device 100. In order to achieve such a purpose, the authentication device 200 includes, as functional units, an electromagnetic characteristic acquisition unit (first electromagnetic characteristic acquisition unit) 210, a challenge data generation unit 220, an expected value generation unit 230, a challenge data transmission unit 240, a response data reception unit 250, and a response data determination unit 260.

(Electromagnetic Characteristic Acquisition Unit)

The electromagnetic characteristic acquisition unit 210 is a functional unit to acquire at least one electromagnetic characteristic EMCr from the storage device 500. The electromagnetic characteristic acquisition unit 210 supplies the acquired electromagnetic characteristic EMCr to the challenge data generation unit 220 and the expected value generation unit 230. Note that the data supply may be performed via an unillustrated control unit included in the authentication device 200. The same applies hereinafter.

(Challenge Data Generation Unit)

The challenge data generation unit 220 is a functional unit to generate challenge data based on the electromagnetic characteristic EMCr acquired by the electromagnetic characteristic acquisition unit 210. The challenge data generation unit 220 supplies the generated challenge data to the challenge data transmission unit 240 and the expected value generation unit 230.

(Expected Value Generation Unit)

The expected value generation unit 230 is a functional unit to compare the electromagnetic characteristic EMCr acquired by the electromagnetic characteristic acquisition unit 210 and the challenge data generated by the challenge data generation unit 220, and generate a response data expected value representing a result of the comparison. The expected value generation unit 230 supplies the generated response data expected value to the response data determination unit 260.

(Challenge Data Transmission Unit)

The challenge data transmission unit 240 is a functional unit to transmit the challenge data generated by the challenge data generation unit 220 to the response device 300 via the communication network 400.

(Response Data Reception Unit)

The response data reception unit 250 is a functional unit to receive response data generated by the response device 300 and related to the authentication target device 100 from the response device 300 via the communication network 400.

(Response Data Determination Unit)

The response data determination unit 260 is a functional unit to compare the response data expected value generated by the expected value generation unit 230 and the response data received by the response data reception unit 250, and to determine authenticity of the authentication target device 100.

(Response Device)

The response device 300 is a device to respond to the authentication device 200 by generating the response data on the basis of the electromagnetic characteristics EMCi of the authentication target device 100 and the challenge data received from the authentication device 200, and transmitting the generated response data to the authentication device 200. In order to achieve such a purpose, the response device 300 includes, as functional units, an electromagnetic characteristic acquisition unit (second electromagnetic characteristic acquisition unit) 310, a challenge data reception unit 320, a response data generation unit 330, and a response data transmission unit 340.

(Electromagnetic Characteristic Acquisition Unit)

The electromagnetic characteristic acquisition unit 310 is a functional unit to acquire the electromagnetic characteristics EMCi of the authentication target device 100. The electromagnetic characteristic acquisition unit 310 supplies the acquired electromagnetic characteristics EMCi to the response data generation unit 330. Note that the data supply may be performed via an unillustrated control unit included in the response device 300. The same applies hereinafter.

(Challenge Data Reception Unit)

The challenge data reception unit 320 is a functional unit to receive the challenge data from the authentication device 200 via the communication network 400. The challenge data reception unit 320 supplies the received challenge data to the response data generation unit 330.

(Response Data Generation Unit)

The response data generation unit 330 is a functional unit to collate the electromagnetic characteristics EMCi supplied from the electromagnetic characteristic acquisition unit 310 and the challenge data supplied from the challenge data reception unit 320, and generate response data. The response data generation unit 330 supplies the generated response data to the response data transmission unit 340.

(Response Data Transmission Unit)

The response data transmission unit 340 is a functional unit to transmit the response data generated by the response data generation unit 330 to the authentication device 200 via the communication network 400.

Note that the response device 300 may be a device different from the authentication target device 100 as illustrated in FIG. 1, or may be integrated with the authentication target device 100. In a case where the response device 300 is integrated with the authentication target device 100, for example, the authentication target device 100 includes the functional units of the response device 300.

Figure 2A:
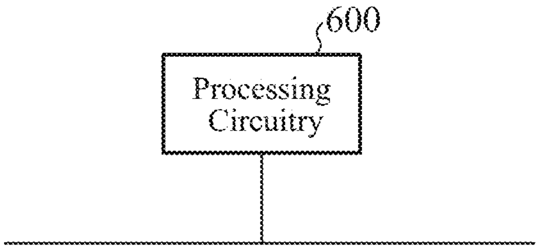
FIG. 2A is a diagram illustrating a configuration example of the hardware of the authentication device and the response device.
Figure 2B:
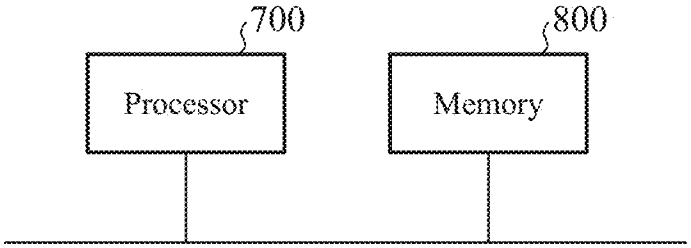
FIG. 2B is a diagram illustrating a configuration example of the hardware of the authentication device and the response device.

Next, configuration examples of the hardware of the authentication device 200 and the response device 300 are explained with reference to FIGS. 2A and 2B. The functional units included in the authentication device 200 and the response device 300 are implemented by processing circuits (processing circuitry). A processing circuit (processing circuitry) may be a dedicated processing circuit (processing circuit) 600 illustrated in FIG. 2A, or may be a processor 700 that executes a program stored in a memory 800 illustrated in FIG. 2B.

In a case where a processing circuit (processing circuitry) is the dedicated processing circuit 600, for example, the dedicated processing circuit 600 is a single circuit, a composite circuit, a programmed processor, a parallel-programmed processor, an application specific integrated circuit (ASIC), a field-programmable gate array (FPGA), or a combination of these. Respective functional units of the authentication device 200 and the response device 300 may be implemented by a plurality of separate processing circuits (processing circuits), or respective functional units may be put together, and implemented by a single processing circuit (processing circuit).

In a case where a processing circuit (processing circuitry) is the processor 700, the functional units of the authentication device 200 and the response device 300 are implemented by software, firmware, or a combination of software and firmware. The software and the firmware are written as programs, and stored in the memory 800. The processor 700 implements the functions of each functional unit by reading out a program stored in the memory, and executing the program. Here, examples of the memory 800 include non-volatile or volatile semiconductor memories such as a random access memory (RAM), a read-only memory (ROM), a flash memory, an erasable programmable read only memory (EPROM), and an electrically erasable programmable read-only memory (EEPROM), a magnetic disk, a flexible disc, an optical disc, a compact disc, a mini disc, and a DVD.

Note that some of the functional units of the authentication device 200 and the response device 300 may be implemented using dedicated hardware, and some of the functional units of the authentication device 200 and the response device 300 may be implemented using software or firmware. In this manner, a processing circuit can implement respective functions mentioned above by hardware, software, firmware, or a combination of these.

<Operations>

Figure 3:
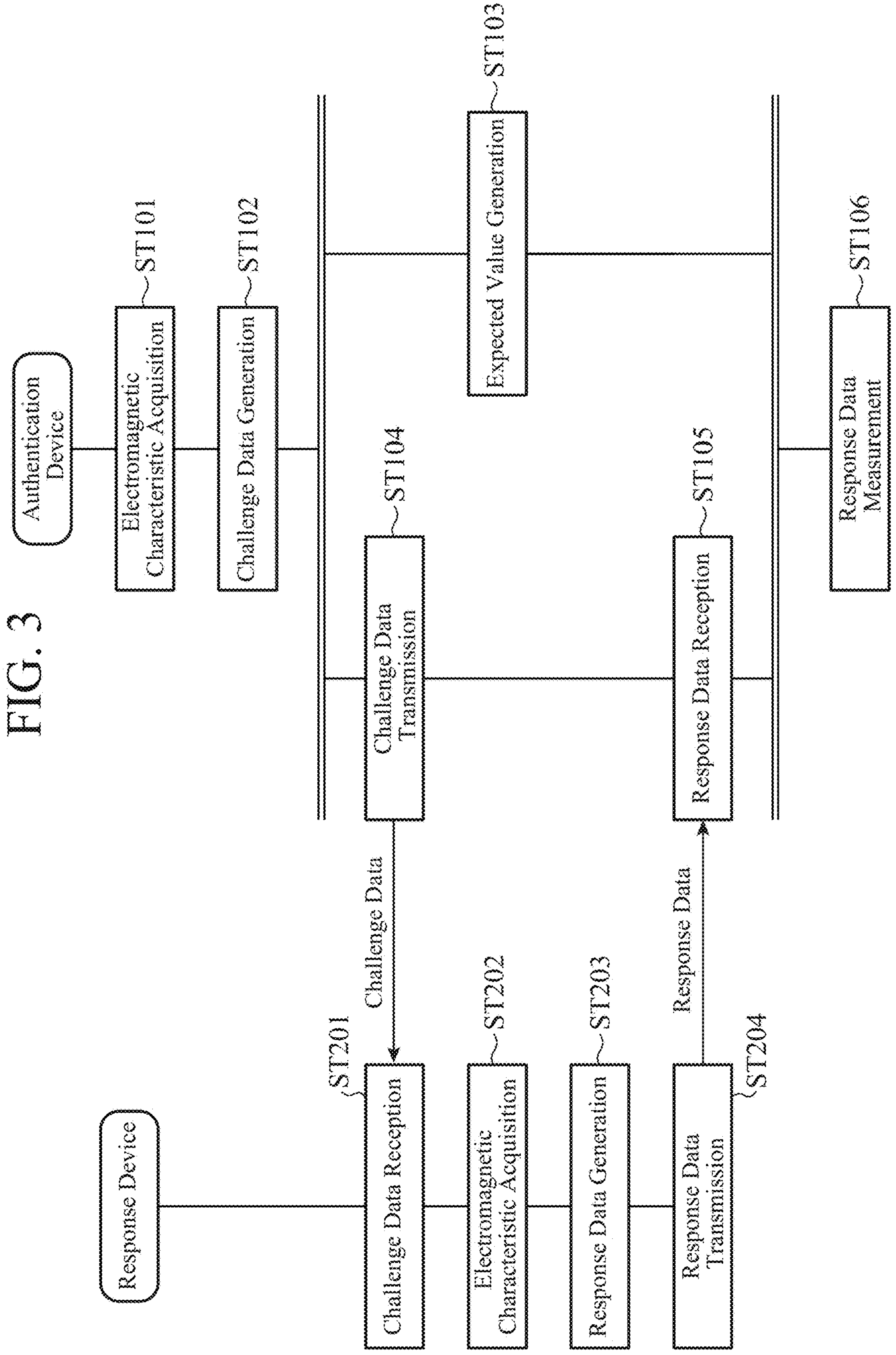
FIG. 3 is a flowchart of an authentication method.

Next, operations performed by the authentication system according to the present disclosure are explained with reference to FIGS. 3 and 4. First, the electromagnetic characteristics EMCi of the authentication target device 100 are registered in advance on the storage device 500 along with identification information about the authentication target device 100. As mentioned above, the electromagnetic characteristics EMCi of the authentication target device 100 registered in the storage device 500 are referred to as the electromagnetic characteristics EMCr. Registration of electromagnetic characteristics EMCi is performed for each authentication target device for which authentication is expected to be performed later on.

The authentication system operates in response to the occurrence of an authentication request regarding the authentication target device 100 made to the authentication device 200 from the authentication target device 100 or another external system (not illustrated). In response to the occurrence of the authentication request, at Step ST101, the electromagnetic characteristic acquisition unit 210 of the authentication device 200 acquires the electromagnetic characteristic EMCr of the target authentication target device 100 from one electromagnetic characteristic or two or more electromagnetic characteristics registered in the storage device 500.

At Step ST102, the challenge data generation unit 220 generates challenge data which is a dataset based on the electromagnetic characteristic EMCr. The "dataset based on the electromagnetic characteristic EMCr" means a dataset which is a set of X-axis values X along the X axis of the electromagnetic characteristic EMCr in a two-dimensional graph representing the electromagnetic characteristic EMCr, and Y-axis values Y corresponding to the X-axis values X, and includes at least one set (X, Y) of an X-axis value X and a Y-axis value Y which is a value smaller than the maximum value of the electromagnetic characteristic EMCr and greater than the minimum value of the electromagnetic characteristic EMCr.

As an example, the challenge data generation unit 220 generates, as the challenge data, a set [Xn, Yn] (n is an integer) of a plurality of X-axis values (Xn; e.g. frequency or time) of the electromagnetic characteristic EMCr, and threshold values for Y-axis values (Yn; e.g. gain, phase, or signal waveform) corresponding to the respective X-axis values. In a case where the challenge data is generated by combining a plurality of electromagnetic characteristics, for example, the challenge data may be in a format, [Xn, Y1*n*, Y2*n*, . . . ] (n is an integer), including sets each including threshold values Y1*n* and Y2*n* of different characteristics corresponding to a common X-axis value (Xn). The challenge data generation unit 220 randomly generates such challenge data every time an authentication request occurs. That is, all or some of the number of n along the X axis, X-axis values (Xn), and Y-axis threshold values Yn corresponding to Xn are generated randomly every time an authentication request occurs, even for the same authentication target device 100.

In addition, as another example, the challenge data generation unit 220 may generate, as the challenge data, a set [Xn, Y] (n is an integer) of a plurality of X-axis values Xn and a common and single Y-axis threshold value Y corresponding to the plurality of X-axis values.

In addition, as another example, as the challenge data, the challenge data generation unit 220 may generate, regarding the X axis, a shared plurality of X-axis values Xn which are fixed values that are pre-shared by the authentication device 200 and the response device 300 or which are variable values that are generated using a common tool every time an authentication request is made, and are shared by the authentication device 200 and the response device 300, and generate, regarding the Y axis, a plurality of Y-axis threshold values Yn which are mutually different for the shared plurality of X-axis values.

In addition, as another example, as the challenge data, the challenge data generation unit 220 may generate, regarding the X axis, a shared plurality of X-axis values Xn which are fixed values that are pre-shared by the authentication device 200 and the response device 300 or which are variable values that are generated using a common tool every time an authentication request is made, and are shared by the authentication device 200 and the response device 300, and generate, regarding the Y axis, a common and single Y-axis threshold value Y for the shared plurality of X-axis values.

In addition, as an example, the challenge data generation unit 220 may generate random values as some or all of a plurality of X-axis values Xn and a Y-axis threshold value Y or Y-axis threshold values Yn corresponding to the respective X-axis values every time an authentication request occurs.

At Step ST103, the expected value generation unit 230 compares the electromagnetic characteristic EMCr and the generated challenge data, and generates a response data expected value representing a result of the comparison. That is, the expected value generation unit 230 generates a response data expected value expected for the generated challenge data. For example, the expected value generation unit 230 collates the electromagnetic characteristic EMCr of the authentication target device 100 and the generated challenge data, and generates, as a response data expected value, an n-bit bit string (first data) including values which are set to “1” in a case where the level of the electromagnetic characteristic EMCr corresponding to specified Xn is equal to or greater than Yn, and are set to “0” in a case where the level of the electromagnetic characteristic EMCr corresponding to specified Xn is smaller than Yn. Note that it is assumed that a method of generating response data from electromagnetic characteristics and challenge data in this manner is set also in the response data generation unit 330 of the response device 300 in advance.

At Step ST104, in parallel with, before, or after the generation of the response data expected value, the challenge data transmission unit 240 transmits the challenge data to the response device 300 via the communication network 400.

The challenge data transmitted from the authentication device 200 in this manner is received by the challenge data reception unit 320 of the response device 300 via the communication network 400 (Step ST201).

At Step ST202, on the basis of the reception of the challenge data, the electromagnetic characteristic acquisition unit 310 acquires the electromagnetic characteristics EMCi of the authentication target device 100 that is an authenticity-check target. For example, the electromagnetic characteristic acquisition unit 310 acquires electromagnetic characteristics EMCi registered as data in the authentication target device 100, performs measurement of characteristics using a function equivalent to a network analyzer in the case of characteristics like S parameters (in the case of characteristics such as F, Z, or Y parameters, conversion of the characteristics also is performed), and performs measurement of characteristics using a function equivalent to a signal generator and a function equivalent to an oscilloscope in the case of characteristics of response to step waves or impulse waves.

Next, at Step ST203, the response data generation unit 330 compares the acquired electromagnetic characteristics EMCi of the authentication target device 100, that is the authenticity-check target, and the received challenge data, and generates a result of the comparison as response data. Explaining in terms of the example described above, similarly to the operation performed by the expected value generation unit 230, the response data generation unit 330 generates, as response data, an n-bit bit string (second data) including values which are set to “1” in a case where the level of the electromagnetic characteristics EMCi corresponding to Xn specified by the challenge data is equal to or greater than Yn, and are set to “0” in a case where the level of the electromagnetic characteristics EMCi corresponding to Xn specified by the challenge data is smaller than Yn. The response data generation unit 330 passes the generated response data to the response data transmission unit 340.

Next, at Step ST204, the response data transmission unit 340 transmits the generated response data to the authentication device 200 via the communication network 400.

The response data transmitted from the response device 300 in this manner is received by the response data reception unit 250 of the authentication device 200 via the communication network 400 (Step ST105).

Last, at Step ST106, the response data determination unit 260 compares the response data expected value generated by the expected value generation unit 230 and the response data received by the response data reception unit 250, and determines the authenticity of the authentication target device 100. For example, the response data determination unit 260 compares the n-bit response data expected value generated by the expected value generation unit 230 and the n-bit response data received by the response data reception unit 250, and authenticates the authenticity of the authentication target device if the n-bit response data expected value and the n-bit response data match completely or a certain amount of bits out of the n-bit response data expected value and the n-bit response data (e.g. 85% of all the bits or higher) match. An authentication result is conveyed to the authentication target device 100 from which an authentication request has occurred, another external system (not illustrated), or the like.

Figure 4:
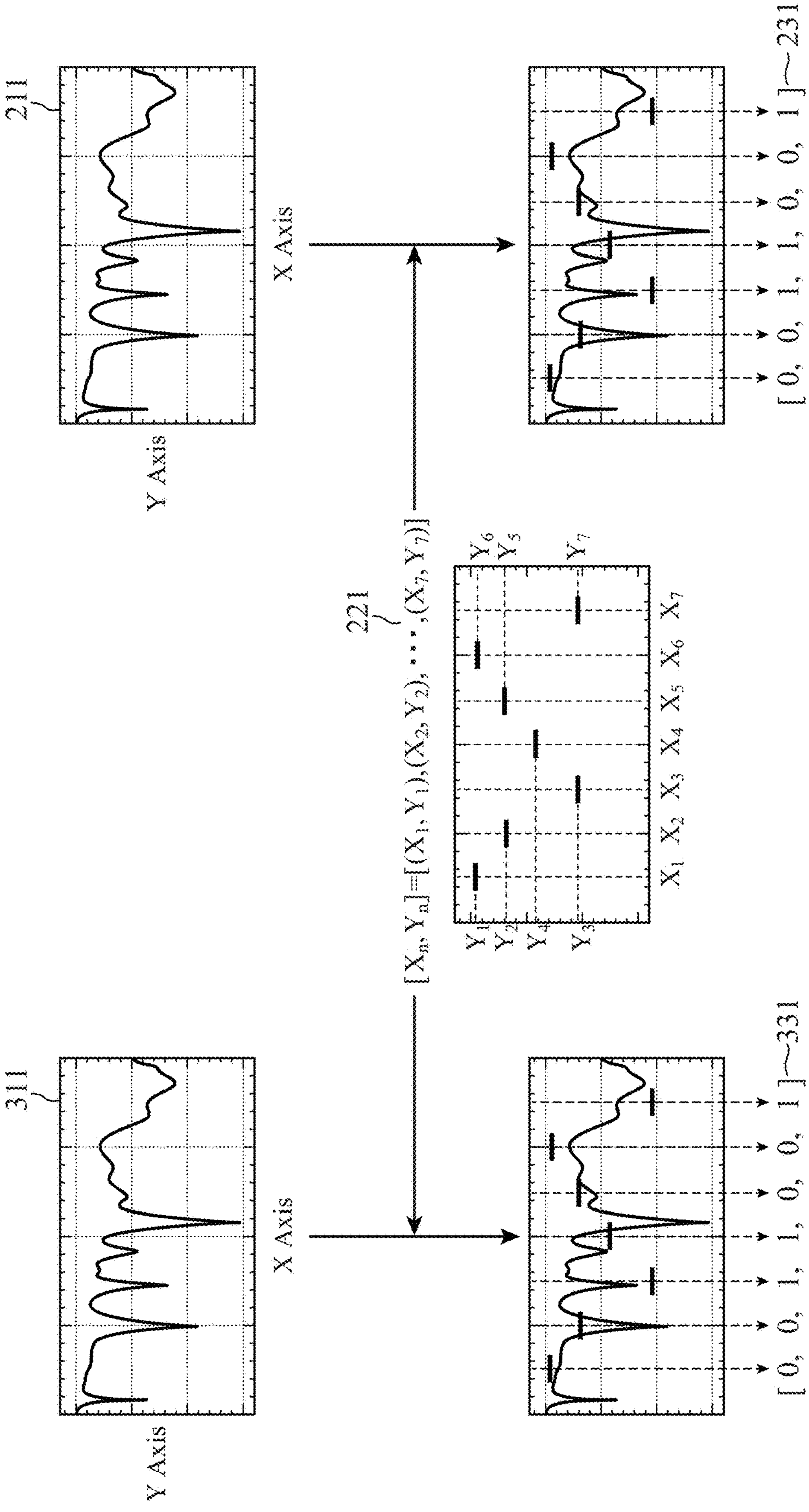
FIG. 4 is a diagram illustrating examples of electromagnetic characteristics (EMCi, EMCr), challenge data, response data, and response data expected values.

FIG. 4 is a diagram illustrating examples of electromagnetic characteristics (EMCi, EMCr), challenge data, response data, and response data expected values illustrated as examples in the operation explanation described above.

A reference numeral 211 denotes an example of the registered electromagnetic characteristic EMCr of the authentication target device acquired by the electromagnetic characteristic acquisition unit 210 of the authentication device 200. As illustrated in FIG. 4, the electromagnetic characteristic EMCr is a characteristic expressed as a two-dimensional graph including an X axis and a Y axis.

A reference numeral 221 denotes an example of challenge data generated by the challenge data generation unit 220 of the authentication device 200. The illustrated challenge data includes a set [Xn, Yn] (n is an integer) of a plurality of X-axis values of the electromagnetic characteristic (the X axis represents frequency or time, for example) and threshold values for Y-axis values corresponding to the X-axis values.

A reference numeral 311 denotes an example of the electromagnetic characteristics EMCi of the authentication target device 100 acquired by the electromagnetic characteristic acquisition unit 310 of the response device 300. As illustrated in FIG. 4, the electromagnetic characteristics EMCi are characteristics expressed as a two-dimensional graph including an X axis and a Y axis.

A reference numeral 331 is response data including a 7-bit bit string generated by the response data generation unit 330 by collating the challenge data 221 received by the challenge data reception unit 320 and the electromagnetic characteristics 311 of the authentication target device 100 acquired by the electromagnetic characteristic acquisition unit 310, the 7-bit bit string including values which are set to “1” in a case where the level of the inherent electromagnetic characteristics 311 corresponding to Xn along the X axis specified by the challenge data 221 is equal to or greater than Yn, and are set to “0” in a case where the level of the inherent electromagnetic characteristics 311 corresponding to Xn along the X axis specified by the challenge data 221 is smaller than Yn. In this manner, the response data generation unit 330 compares Y-axis threshold values Yn and Y-axis values corresponding to a plurality of X-axis values Xn in the electromagnetic characteristics 311, determines which of the Y-axis threshold values Yn and the Y-axis values in the electromagnetic characteristics 311 is greater, and generates 7-bit data.

A reference numeral 231 denotes a response data expected value including 7-bit bit string generated by the expected value generation unit 230 by collating the electromagnetic characteristics 211 acquired by the electromagnetic characteristic acquisition unit 210 and the challenge data 221 generated by the challenge data generation unit 220, the 7-bit bit string including values which are set to “1” in a case where the level of the electromagnetic characteristics 211 corresponding to Xn along the X axis specified by the challenge data 221 is equal to or greater than Yn, and are set to “0” in a case where the electromagnetic characteristics 211 corresponding to Xn along the X axis specified by the challenge data 221 is smaller than Yn. In this manner, the expected value generation unit 230 compares Y-axis threshold values Yn and Y-axis values corresponding to a plurality of X-axis values Xn in the electromagnetic characteristics 211, determines which of the Y-axis threshold values Yn and the Y-axis values in the electromagnetic characteristics 211 is greater, and generates 7-bit data.

The response data 331 is transmitted from the response data transmission unit 340 of the response device 300, and received by the response data reception unit 250 of the authentication device 200 via the communication network 400. The response data determination unit 260 compares the response data 331 and the response data expected value 231 generated by the expected value generation unit 230. The authentication device 200 determines the authenticity of the authentication target device if the response data 331 and the response data expected value 231 match completely or a certain amount of bits out of the response data 331 and the response data expected value 231 match.

As mentioned above, in a case where authentication of an electronic device is performed using electromagnetic characteristics inherent to the device, challenge data corresponding to the inherent electromagnetic characteristics of the authentication target device is generated randomly every time an authentication request occurs, and is transmitted via a communication network, and authentication is performed using response data corresponding to the challenge data. Accordingly, authentication via the communication network can be performed. In addition, even if the challenge data or the response data is eavesdropped on the communication network, it is possible to prevent false authentication from being performed by spoofing or the like since the electromagnetic characteristics inherent to the device are kept confidential.

Second Embodiment

As for a second embodiment and embodiments thereafter, overlapping explanation of matters common to the first embodiment and the subsequent embodiments is omitted, and it is tried to explain differences from the first embodiment.

The overall configuration diagram of an authentication system including an authentication device and a response device according to the second embodiment is the same as the one in FIG. 1 similarly to the first embodiment.

In the second embodiment, a challenge data generation unit 220 may generate, as challenge data, a set [Xn, Y] (n is an integer) of a plurality of X-axis values (Xn; e.g. the X axis represents frequency or time) of electromagnetic characteristics EMCr, and a common and single Y-axis threshold value (Y) corresponding to the plurality of X-axis values, every time an authentication request occurs.

The challenge data generation unit 220 may randomly generate a plurality of X-axis values Xn and a common and single Y-axis threshold value Y every time an authentication request occurs.

An expected value generation unit 230 compares the Y-axis threshold value Y and Y-axis values corresponding to a plurality of X-axis values Xn in electromagnetic characteristics 211, and determines which of the Y-axis threshold value Y and the Y-axis values in the electromagnetic characteristics 211 is greater.

A response data generation unit 330 compares the Y-axis threshold value Y and Y-axis values corresponding to a plurality of X-axis values Xn in electromagnetic characteristics 311, and determines which of the Y-axis threshold value Y and the Y-axis values in the electromagnetic characteristics 311 is greater.

By generating challenge data in this manner, it is possible to achieve an advantage that the data amount of the challenge data can be reduced as compared to the first embodiment.

Third Embodiment

The overall configuration diagram of an authentication system including an authentication device and a response device according to a third embodiment is the same as the one in FIG. 1 similarly to the first embodiment.

In the third embodiment, it is assumed that a plurality of X-axis values are pre-shared by an authentication device 200 and a response device 300. A challenge data generation unit 220 acquires the shared plurality of X-axis values by memory reference. The shared plurality of X-axis values may always be the same, or may be changed in accordance with a predetermined certain rule every time an authentication request occurs.

In a case where a plurality of X-axis values are shared in this manner, the challenge data generation unit 220 may generate, regarding the X axis, a shared plurality of X-axis values Xn which are fixed values that are pre-shared by the authentication device 200 and the response device 300 or which are variable values that are generated using a common tool every time an authentication request is made, and are shared by the authentication device 200 and the response device 300, and generate, regarding the Y axis, a plurality of Y-axis threshold values Yn which are mutually different for the shared plurality of X-axis values.

In addition, from among a plurality of X-axis values Xn and a plurality of Y-axis threshold values Yn generated by the challenge data generation unit 220, a challenge data transmission unit 240 may transmit only the generated plurality of Y-axis threshold values Yn as [Yn] (n is an integer).

With such a configuration, it is possible to achieve an advantage that the data amount of challenge data can be further reduced as compared to the second embodiment.

Fourth Embodiment

The overall configuration diagram of an authentication system including an authentication device and a response device according to a fourth embodiment is the same as the one in FIG. 1 similarly to the first embodiment.

In the fourth embodiment, it is assumed that a plurality of X-axis values are pre-shared by an authentication device 200 and a response device 300. A challenge data generation unit 220 acquires the shared plurality of X-axis values by memory reference. The shared plurality of X-axis values may always be the same, or may be changed in accordance with a certain rule every time an authentication request occurs.

In a case where a plurality of X-axis values are shared in this manner, the challenge data generation unit 220 may generate, regarding the X axis, a shared plurality of X-axis values Xn which are fixed values that are pre-shared by the authentication device 200 and the response device 300 or which are variable values that are generated using a common tool every time an authentication request is made, and are shared by the authentication device 200 and the response device 300, and generate, regarding the Y axis, a common and single Y-axis threshold value Y for the shared plurality of X-axis values Xn.

In addition, from among a generated plurality of X-axis values Xn and single Y-axis threshold value Y, a challenge data transmission unit 240 may transmit only the generated single Y-axis threshold values Y as [Y].

With such a configuration, it is possible to achieve an advantage that the data amount of challenge data can be significantly reduced.

Fifth Embodiment

The overall configuration diagram of an authentication system including an authentication device and a response device according to a fifth embodiment is the same as the one in FIG. 1 similarly to the first embodiment.

In the fifth embodiment, a challenge data generation unit 220 may randomly generate Y-axis threshold values corresponding to X-axis values in electromagnetic characteristics EMCr from ranges that cover a certain percentage of Y values from the Y values, e.g. from ranges of Y values of the electromagnetic characteristics EMCr±10%. The challenge data generation unit 220 in the first to third embodiments also may generate Y-axis threshold values from ranges that cover a certain percentage of Y values from the Y values.

Thereby, it is possible to achieve an advantage that, even if electromagnetic characteristics EMCi change a little due to environmental changes, ageing, and the like, their influence on threshold value checks can be reduced.

Sixth Embodiment

The overall configuration diagram of an authentication system including an authentication device and a response device according to a sixth embodiment is the same as the one in FIG. 1 similarly to the first embodiment.

In the sixth embodiment, an expected value generation unit 230 and a response data generation unit 330 may treat, as response data, a result of a calculation according to a predetermined rule on a generated bit string representing a result of comparison with Y-axis threshold values corresponding to X-axis values. For example, the expected value generation unit 230 and the response data generation unit 330 may perform encoding or encryption on the bit string representing the comparison result. The expected value generation unit 230 and the response data generation unit 330 in the first to fifth embodiments also may operate similarly.

Thereby, it is possible to achieve an advantage that, even if challenge data and response data are eavesdropped multiple times, it is difficult to estimate electromagnetic characteristics EMCi or electromagnetic characteristics EMCr of an authentication target device.

Note that embodiments can be combined, and each embodiment can be modified or omitted as appropriate.

INDUSTRIAL APPLICABILITY

The authentication system according to the present disclosure can be used as an authentication system for authentication target devices that performs authentication via a communication network.

REFERENCE SIGNS LIST

100: Authentication target device; 200: Authentication device; 203: Expected value generation unit; 210: Electromagnetic characteristic acquisition unit (First electromagnetic characteristic acquisition unit); 211: Electromagnetic characteristic EMCr; 220: Challenge data generation unit; 221: Challenge data; 230: Expected value generation unit;

231: Response data expected value; 240: Challenge data transmission unit; 250: Response data reception unit; 260: Response data determination unit; 300: Response device; 310: Electromagnetic characteristic acquisition unit (Second electromagnetic characteristic acquisition unit); 311: Electromagnetic characteristic EMCi; 320: Challenge data reception unit; 330: Response data generation unit; 331: Response data; 340: Response data transmission unit; 400: Communication network; 500: Storage device; 600: Processing circuit; 700: Processor; 800: Memory

What is claimed is:

1. An authentication device comprising:

processing circuitry to generate challenge data which is a dataset based on at least one electromagnetic characteristic of a first authentication target device, acquired from the first authentication target device;

to perform a comparison between the electromagnetic characteristic of the first authentication target device and the generated challenge data, and to generate a response data expected value representing a result of the comparison; and to perform a comparison between the generated response data expected value and response data related to a second authentication target device transmitted from a response device, and to determine authenticity of the second authentication target device, wherein the generated challenge data is transmitted to the response device, a result of a comparison between an electromagnetic characteristic of the second authentication target device, acquired from the second authentication target device, and the transmitted challenge data is received as the response data from the response device, the electromagnetic characteristic of the first authentication target device and the electromagnetic characteristic of the second authentication target device are characteristics expressed as a two-dimensional graph including an X axis and a Y axis, and the challenge data is generated as a set [Xn, Yn] (n is an integer) of a plurality of X-axis values Xn and Y-axis threshold values Yn corresponding to the respective X-axis values.

2. The authentication device according to claim 1, wherein the Y-axis threshold values Yn of the challenge data is a common and single Y-axis threshold value Y corresponding to the plurality of X-axis values.

3. The authentication device according to claim 1, wherein the processing circuitry generates, regarding the X axis, a shared plurality of X-axis values Xn which are fixed values that are pre-shared by the authentication device and the response device or which are variable values that are generated using a common tool every time an authentication request is made, and are shared by the authentication device and the response device; and generates, regarding the Y axis, a plurality of Y-axis threshold values Yn which are mutually different for the shared plurality of X-axis values; and from among the generated plurality of X-axis values Xn and plurality of Y-axis threshold values Yn, the authentication device transmits only the generated plurality of Y-axis threshold values Yn as [Yn] (n is an integer).

4. The authentication device according to claim 1, wherein the processing circuitry generates, regarding the X axis, a shared plurality of X-axis values Xn which are fixed values that are pre-shared by the authentication device and the response device or which are variable values that are generated using a common tool every time an authentication request is made, and are shared by the authentication device and the response device; and generates, regarding the Y axis, a common and single Y-axis threshold value Y for the shared plurality of X-axis values Xn, and from among the generated plurality of X-axis values Xn and single Y-axis threshold value Y, the authentication device transmits only the generated single Y-axis threshold value Y as [Y].

5. The authentication device according to claim 1, wherein some or all of the plurality of X-axis values Xn and the Y-axis threshold value Y or Y-axis threshold values Yn corresponding to the respective X-axis values are generated as random values every time an authentication request occurs.

6. The authentication device according to claim 5, wherein the electromagnetic characteristic of the first authentication target device, acquired from the first authentication target device, includes two electromagnetic characteristics, and for each of the two or more electromagnetic characteristics, the processing circuitry generates a plurality of X-axis values Xn and a Y-axis threshold value Y or Y-axis threshold values Yn corresponding to the plurality of X-axis values Xn, and generates, as the challenge data, a combination of the X-axis values Xn and the Y-axis threshold value Y or Y-axis threshold values Yn.

7. The authentication device according to claim 6, wherein the processing circuitry compares the Y-axis threshold values Yn or Y-axis threshold value Y and Y-axis values corresponding to the plurality of X-axis values Xn in the electromagnetic characteristics of the first authentication target device, determines which of the Y-axis threshold values Yn or Y-axis threshold value Y and the Y-axis values in the electromagnetic characteristics of the first authentication target device are or is greater, and generates n-bit first data, and the response device compares the Y-axis threshold values Yn or Y-axis threshold value Y and Y-axis values corresponding to the plurality of X-axis values Xn in the electromagnetic characteristics of the second authentication target device, determines which of the Y-axis threshold values Yn or Y-axis threshold value Y and the Y-axis values in the electromagnetic characteristics of the second authentication target device are or is greater, and generates n-bit second data.

8. The authentication device according to claim 6, wherein the processing circuitry compares the Y-axis threshold values Yn or Y-axis threshold value Y and Y-axis values corresponding to the plurality of X-axis values Xn in the electromagnetic characteristics of the first authentication target device, determines which of the Y-axis threshold values Yn or Y-axis threshold value Y and the Y-axis values in the electromagnetic characteristics of the first authentication target device are or is greater, generates n-bit first data, and performs a predetermined calculation on the generated first data, and the response device compares the Y-axis threshold values Yn or Y-axis threshold value Y and Y-axis values corresponding to the plurality of X-axis values Xn in the electromagnetic characteristics of the second authentication target device, determines which of the Y-axis threshold values Yn or Y-axis threshold value Y and the Y-axis values in the electromagnetic characteristics of the second authentication target device are or is greater, generates n-bit second data, and performs the predetermined calculation on the generated second data.

9. An authentication system comprising:

the authentication device according to claim 1; and the response device according to claim 1, wherein the response device includes a processing circuitry to perform a comparison between the electromagnetic characteristics of the second authentication target device, acquired from the second authentication target device and the challenge data transmitted from the authentication device, and to generate a result of the comparison as the response data.

10. The authentication system according to claim 9, wherein the response device and the second authentication target device are integrated.

11. An authentication method comprising:

generating challenge data which is a dataset based on at least one electromagnetic characteristic of a first authentication target device, acquired from the first authentication target device;

performing a comparison between the electromagnetic characteristic of the first authentication target device and the generated challenge data, and generating a response data expected value representing a result of the comparison;

transmitting the generated challenge data to the response device;

performing a comparison between the electromagnetic characteristic of the second authentication target device, acquired from the second authentication target device and the challenge data transmitted from the authentication device, and to generate response data as a result of the comparison;

transmitting the generated response data;

comparing the generated response data expected value and the transmitted response data, and determining authenticity of the second authentication target device, wherein the electromagnetic characteristic of the first authentication target device and the electromagnetic characteristic of the second authentication target device are characteristics expressed as a two-dimensional graph including an X axis and a Y axis, and the challenge data is generated as a set [Xn, Yn] (n is an integer) of a plurality of X-axis values Xn and Y-axis threshold values Yn corresponding to the respective X-axis values.

12. The authentication method according to claim 11, wherein the Y-axis threshold values Yn of the challenge data is a common and single Y-axis threshold value Y corresponding to the plurality of X-axis values.

13. The authentication method according to claim 11, further comprising:

generating, regarding the X axis, a shared plurality of X-axis values Xn which are fixed values that are pre-shared by the authentication device and the response device or which are variable values that are generated using a common tool every time an authentication request is made, and are shared by the authentication device and the response device; and generating, regarding the Y axis, a plurality of Y-axis threshold values Yn which are mutually different for the shared plurality of X-axis values; and from among the generated plurality of X-axis values Xn and plurality of Y-axis threshold values Yn, the authentication device transmits only the generated plurality of Y-axis threshold values Yn as [Yn] (n is an integer).

14. The authentication method according to claim 11, further comprising:

generating, regarding the X axis, a shared plurality of X-axis values Xn which are fixed values that are pre-shared by the authentication device and the response device or which are variable values that are generated using a common tool every time an authentication request is made, and are shared by the authentication device and the response device; and generating, regarding the Y axis, a common and single Y-axis threshold value Y for the shared plurality of X-axis values Xn, and from among the generated plurality of X-axis values Xn and single Y-axis threshold value Y, the authentication device transmits only the generated single Y-axis threshold value Y as [Y].

15. The authentication method according to claim 11, wherein some or all of the plurality of X-axis values Xn and the Y-axis threshold value Y or Y-axis threshold values Yn corresponding to the respective X-axis values are generated as random values every time an authentication request occurs.

16. The authentication method according to claim 15, wherein the electromagnetic characteristic of the first authentication target device acquired from the first authentication target device includes two electromagnetic characteristics, and further comprising:

for each of the two or more electromagnetic characteristics, generating a plurality of X-axis values Xn and a Y-axis threshold value Y or Y-axis threshold values Yn corresponding to the plurality of X-axis values Xn, and generating, as the challenge data, a combination of the X-axis values Xn and the Y-axis threshold value Y or Y-axis threshold values Yn.

17. The authentication method according to claim 16, further comprising:

comparing the Y-axis threshold values Yn or Y-axis threshold value Y and Y-axis values corresponding to the plurality of X-axis values Xn in the electromagnetic characteristics of the first authentication target device, determining which of the Y-axis threshold values Yn or Y-axis threshold value Y and the Y-axis values in the electromagnetic characteristics of the first authentication target device are or is greater, and generating n-bit first data, and comparing the Y-axis threshold values Yn or Y-axis threshold value Y and Y-axis values corresponding to the plurality of X-axis values Xn in the electromagnetic characteristics of the second authentication target device, determining which of the Y-axis threshold values Yn or Y-axis threshold value Y and the Y-axis values in the electromagnetic characteristics of the second authentication target device are or is greater, and generating n-bit second data.

18. The authentication method according to claim 16, further comprising:

comparing the Y-axis threshold values Yn or Y-axis threshold value Y and Y-axis values corresponding to the plurality of X-axis values Xn in the electromagnetic characteristics of the first authentication target device, determining which of the Y-axis threshold values Yn or Y-axis threshold value Y and the Y-axis values in the electromagnetic characteristics of the first authentication target device are or is greater, generating n-bit first data, and performing a predetermined calculation on the generated first data, and comparing the Y-axis threshold values Yn or Y-axis threshold value Y and Y-axis values corresponding to the plurality of X-axis values Xn in the electromagnetic characteristics of the second authentication target device, determining which of the Y-axis threshold values Yn or Y-axis threshold value Y and the Y-axis values in the electromagnetic characteristics of the second authentication target device are or is greater, generating n-bit second data, and performing the predetermined calculation on the generated second data.

* * * * *